(12) United States Patent
Lucka et al.

(10) Patent No.: US 11,415,086 B2
(45) Date of Patent: Aug. 16, 2022

(54) THREE PORT, FIVE-WAY MAGNETICALLY LATCHING VALVE FOR FUEL VAPOR MANAGEMENT SYSTEMS AND SYSTEMS INCORPORATING SAME

(71) Applicant: DAYCO IP HOLDINGS, LLC, Troy, MI (US)

(72) Inventors: Kevin W. Lucka, Southfield, MI (US); Donald P. Tinsley, III, Huntington Woods, MI (US); Matthew C. Gilmer, South Lyon, MI (US); Chester E. Duffield, III, Warren, MI (US); Aaron Diamond, Alpena, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/467,846

(22) Filed: Sep. 7, 2021

(65) Prior Publication Data

US 2022/0074371 A1    Mar. 10, 2022

Related U.S. Application Data

(60) Provisional application No. 63/075,230, filed on Sep. 7, 2020.

(51) Int. Cl.
*F02M 25/00*    (2006.01)
*F02M 25/08*    (2006.01)
(Continued)

(52) U.S. Cl.
CPC ..... *F02M 25/0836* (2013.01); *B01D 53/0415* (2013.01); *B01D 53/0446* (2013.01);
(Continued)

(58) Field of Classification Search
CPC ......... F16K 31/08–084; F16K 31/0624; F16K 11/24; F02M 25/0836; B01D 53/0415;
(Continued)

(56) References Cited

U.S. PATENT DOCUMENTS 4,245,466 A * 1/1981 Mendenhall .......... F01N 13/009
  60/306
5,235,955 A * 8/1993 Osaki ................. F02M 25/0872
  123/520

(Continued)

FOREIGN PATENT DOCUMENTS

WO     2018049114 A1    3/2018

OTHER PUBLICATIONS

International Search and Written Opinion, PCT/US21/49220, dated Dec. 23, 2021 (6 pages).

*Primary Examiner* — Sizo B Vilakazi
*Assistant Examiner* — Sherman D Manley
(74) *Attorney, Agent, or Firm* — FisherBroyles, LLP; Susan M. Oiler

(57) ABSTRACT

Three-port latching valves have a housing with a first port, a second port, and a third port in controlled fluid communication with one another by three, individually electronically controllable magnetically latching valves for a combination of five different flow options. Each valve has a solenoid with an armature movable between an open position and a closed position, a poppet valve connected to the armature, a permanent magnet fixedly seated at a position for magnetically latching the armature in the open position, and a spring positioned to bias the poppet valve closed when the armature is in the closed position. The spring has a pre-selected spring rate that mechanically relieves pressure if the spring rate is exceeded. The armature is movable to the open position after a pulse of voltage to the solenoid and is (Continued)

in an unpowered state after translation to either of the open position or the closed position.

20 Claims, 6 Drawing Sheets

(51) Int. Cl.
*F16K 11/24* (2006.01)
*F16K 31/08* (2006.01)
*F16K 31/06* (2006.01)
*B01D 53/04* (2006.01)

(52) U.S. Cl.
CPC .......... *F16K 11/24* (2013.01); *F16K 31/0624* (2013.01); *F16K 31/084* (2013.01); *B01D 2253/102* (2013.01); *B01D 2257/702* (2013.01); *B01D 2259/4516* (2013.01); *B01D 2259/4566* (2013.01)

(58) Field of Classification Search
CPC .......... B01D 53/0446; B01D 2253/102; B01D 2257/702; B01D 2259/4516; B01D 2259/4566
See application file for complete search history.

(56) References Cited

U.S. PATENT DOCUMENTS

| | | | | |
|---|---|---|---|---|
| 5,259,416 A * | 11/1993 | Kunz | ................... | F16K 31/082 251/65 |
| 5,445,446 A * | 8/1995 | Yamamuro | ........... | B60T 8/4291 303/119.2 |
| 5,617,815 A * | 4/1997 | Spies | .................... | F16K 11/076 123/41.1 |
| 5,927,334 A * | 7/1999 | Ishigaki | ................ | F16K 11/044 137/596.17 |
| 6,199,587 B1 * | 3/2001 | Shlomi | ................. | F16K 31/082 137/625.5 |
| 6,425,409 B1 * | 7/2002 | Cross | .................. | F16K 31/0627 137/884 |
| 6,742,537 B2 * | 6/2004 | Martus | ............... | F02M 25/0836 137/557 |
| 7,814,892 B2 * | 10/2010 | Hill | ..................... | F16K 11/0716 123/519 |
| 8,191,536 B2 * | 6/2012 | Devries | .............. | F02M 25/0836 123/481 |
| 9,534,704 B2 | 1/2017 | Hampton et al. | | |
| 9,827,963 B2 | 11/2017 | Fletcher et al. | | |
| 10,851,736 B1 * | 12/2020 | Ozika | ................ | F02M 25/0836 |
| 2001/0037832 A1 * | 11/2001 | Weiss | .................. | F16K 31/0627 137/627.5 |
| 2005/0047923 A1 * | 3/2005 | Li | .......................... | A47C 27/10 417/44.9 |
| 2005/0137773 A1 * | 6/2005 | Goebels | .............. | B60R 16/0233 701/70 |
| 2018/0195467 A1 | 7/2018 | Dudar | | |
| 2019/0195383 A1 | 6/2019 | Nasser et al. | | |
| 2020/0198462 A1 * | 6/2020 | Koukan | .................. | F16K 11/24 |

* cited by examiner

THREE PORT, FIVE-WAY MAGNETICALLY LATCHING VALVE FOR FUEL VAPOR MANAGEMENT SYSTEMS AND SYSTEMS INCORPORATING SAME

RELATED APPLICATIONS

This application claims the benefit of U.S. Provisional Application No. 63/075,230, filed Sep. 7, 2020, the entirety of which is incorporated herein by reference.

TECHNICAL FIELD

This application relates to a three-port latching valve for fuel vapor management engine systems, more particularly, to a three-port latching valve that houses three magnetically latching valves, which are each held in the open position during a preselected engine condition by a permanent magnet, is biased closed by a spring during normal operation, and has an over-pressure relief function.

BACKGROUND

A valve that is primarily open when a customer needs to refuel a vehicle with a pressurized fuel system is commonly used in and is required for hybrid vehicles. The valve is located in the fuel vapor system between the fuel tank vapor dome and the fuel vapor carbon canister. The valve also provides a strictly mechanical function of opening and allowing flow under certain conditions to provide pressure relief under normal operating conditions to protect the fuel tank structural integrity.

A refueling valve allows vehicles to meet emissions regulations, such as set by the EPA, CARB, China 6, Euro 6.2 for Hybrid Electric Vehicles (HEVs) and Plug-In Hybrid Electric Vehicles (PHEVs), to keep the vapors stored within the fuel tank. The fuel vapor in a conventional non-hybrid system is allowed to have an open flow path to a fuel vapor canister because the engine will run enough to purge the fuel vapor canister. When the engine is in boost or vacuum, there is an opportunity to draw the fuel vapor off of the carbon particles in the fuel vapor canister and draw the fuel vapor into the intake manifold to be used as fuel. However, in a HEV or PHEV system, where the engine run time is very low, the fuel vapor canister would become saturated with fuel vapor and start emitting the fuel vapor into the atmosphere if there was an open path between the fuel tank and the canister. As such, a non-integrated refueling canister only system (NIRCOS) on HEVs and PHEVs is required, which has a valve that blocks fuel vapors from the fuel tank from flowing to the carbon canister, except during a refueling event.

There is a need to eliminate the hardware needed to index the valve position in commercially available mechanical latching valves in NIRCOS system of hybrid vehicles and to provide a valve that can depressurize the fuel tank vapors to maintain the structural integrity of the fuel tank.

SUMMARY

In all aspects, a three-port latching valve for an engine system is disclosed that has a housing having a first port, a second port, and a third port in controlled fluid communication with one another by three magnetically latching valves enclosed within the housing. Each magnetically latching valve has a solenoid housing enclosing a linearly translatable armature seated therein that is connected to a poppet valve, a permanent magnet fixedly seated within the housing at a position for magnetically latching the armature in the open position, a spring seated around the connection of the armature to the poppet valve with a first end against the poppet valve and a second end against the housing. The armature is movable between an open position and a closed position, respectively, after a pulse of voltage to the solenoid, but is unpowered after translation to either of the open position or the closed position. The spring biases the poppet valve closed when the armature is in the closed position. The spring has a pre-selected spring rate that mechanically relieves pressure if the spring rate is exceeded. The three magnetically latching valves are each individually electrically controllable and collectively provide for a no flow position, flow between the first port and the second port, flow between the first port and the third port, flow between the second port and the third port, and flow between the first port, the second port, and the third port.

In all aspects, the housing defines dual chambers in dual levels, which are separated by a plate. The dual chambers are separated by a first divider wall in a first of the dual levels and a second divider wall in a second of the dual levels. The first divider wall is offset from the second divider wall by a lineal distance (D). The plate has an unobstructed through hole positioned in the lineal distance (D) between the first divider wall and the second divider wall. The plate has a first valve seat opening therethrough that is openable and closable by the poppet valve of the first magnetically latching valve, a second valve seat opening therethrough that is openable and closable by the poppet valve of the second magnetically latching valve, and a third valve seat opening therethrough that is openable and closable by the poppet valve of the third magnetically latching valve. The unobstructed through hole has an area equal to or larger than the area of each of the first, second, and third valve seat openings individually.

In one embodiment, the spring is a coil spring, optionally, a conically shaped coil spring.

In all aspects, the housing has an electrical connector in electrical communication with the solenoid of each of the three magnetically latching valves. A microprocessor for electronic control of the three magnetically latching valve is enclosed within the housing and is in electrical communication with the electrical connector.

In another aspect, a fuel vapor management system for an engine is disclosed. The system has a fuel tank in fluid communication with a filling tube and in fluid communication an intake manifold of an internal combustion engine, a first fuel canister in fluid communication between the fuel tank and the intake manifold, and a three-port latching valve as disclosed herein controlling fluid communication between vapors in the fuel tank, the first fuel vapor canister, and the intake manifold. The fluid communication with the intake manifold can be direct or indirect. When the fluid communication is indirect, it is through a second fuel vapor canister. Each of the three magnetically latching valves within the three-port latching valve is in electrical communication with a controller that controls the opening and closing of each of the three magnetically latching valves individually. The pre-selected spring rate of each of the three magnetically latching valves is selected to open the poppet valve therein.

In all embodiments, the housing of the three-port latching valve has an electrical connector in electrical communication with the solenoid of each of the three magnetically latching valves, and the electrical connector is connected to a mating electrical connector in electrical communication with the controller. In one embodiment, the controller includes an H-bridge control system that reverse the polarity of the solenoid to move the armature between the open position and the closed position.

In some embodiments, the engine is a hybrid internal combustion engine, and a canister purge valve is present that controls fluid communication between the fuel vapor canister and the intake manifold. A secondary three-port latching valve as disclosed herein is positioned upstream of the canister purge valve. The three-port latching valve is in fluid communication with an outlet of the first fuel vapor canister, an outlet of the second fuel vapor canister, and the intake manifold through the canister purge valve.

Selectively, the pre-selected spring rates of the three magnetically latching valves are the same, one is different from the others, or each is different from one another.

In yet another aspect, a fuel vapor management system for an engine is disclosed that has a fuel tank in fluid communication with a filling tube and in fluid communication with a first fuel vapor canister and a second fuel vapor canister which are both in fluid communication with an intake manifold of an internal combustion engine, a vapor blocking valve controlling fluid communication between the vapor dome of the fuel tank and the first and second fuel vapor canisters, and a three-port latching valve as disclosed herein positioned upstream of a canister purge valve. The three-port latching valve controls fluid communication with an outlet of the first fuel vapor canister, an outlet of the second fuel vapor canister, and the intake manifold through the canister purge valve. Each of the three magnetically latching valves within the three-port latching valve is in electrical communication with a controller that controller controls the opening and closing of each of the three magnetically latching valves individually, and the pre-selected spring rate of each of the three magnetically latching valves is selected to open the poppet valve therein.

In all aspects, the housing of the three-port latching valve has an electrical connector in electrical communication with the solenoid of each of the three magnetically latching valves, and the electrical connector is connected to a mating electrical connector in electrical communication with the controller. In one embodiment, the controller includes an H-bridge control system that reverse the polarity of the solenoid to move the armature between the open position and the closed position.

In some embodiments, the engine is a hybrid internal combustion engine, and the pre-selected spring rates of the three magnetically latching valves are the same, one is different from the others, or each is different from one another.

DETAILED DESCRIPTION

Figure 1:
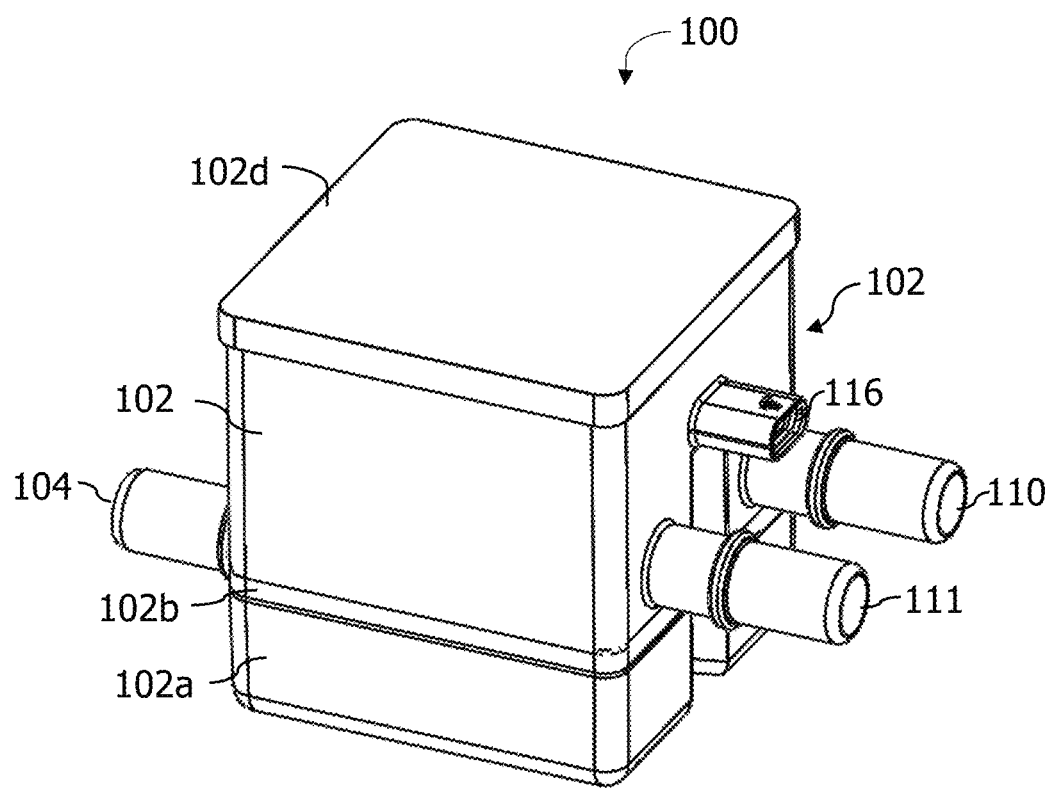
FIG. 1 is a side perspective view of a three-port latching valve.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof. In fuel vapor management systems, the fluid is typically a gas when moving through the magnetic latching valve.

Referring to FIGS. 1-4, a three-port latching valve 100 for a fuel vapor management system is shown. The magnetic latching valve 100 has a housing 102 defined in multiple parts: (i) a base 102a having an internal first divider wall 103 defining a first cavity 106 and a second cavity 107 and having a first port 104 in fluid communication with the first cavity 106, (ii) a first cover 102b having a fluid tight seal to the base 102a and defining a plurality of transversely oriented bores therethrough (transvers to the flow through the first port, vertically relative to the orientation of the figure relative to the page), which define a first valve opening 108 in fluid communication with the first cavity 106, a second valve opening 113 and a third valve opening 115 both in fluid communication with the second cavity 107, and an unobstructed opening 109 in fluid communication with the second cavity 107, (iii) a main body 102c having opposing open ends 130, 131, one of which has a fluid tight seal to the first cover 102b opposite the base 102a, and having a second port 110 and a third port 111 both in fluid communication with a third chamber 128 (labeled in FIG. 4), and (iv) a second cover 102d having a fluid tight seal to the other open end 131 of the main body 102c. The fluid tight seals between the multiple parts may be formed by heat welding, laser welding, a snap-fit, an interference fit, an adhesive bond, or other known or herein after developed methods. The housing 102 is typically plastic, such as, but not limited to, nylon 6, nylon 4/6, nylon 6/6 and/or polyoxymethylene.

Figure 4:
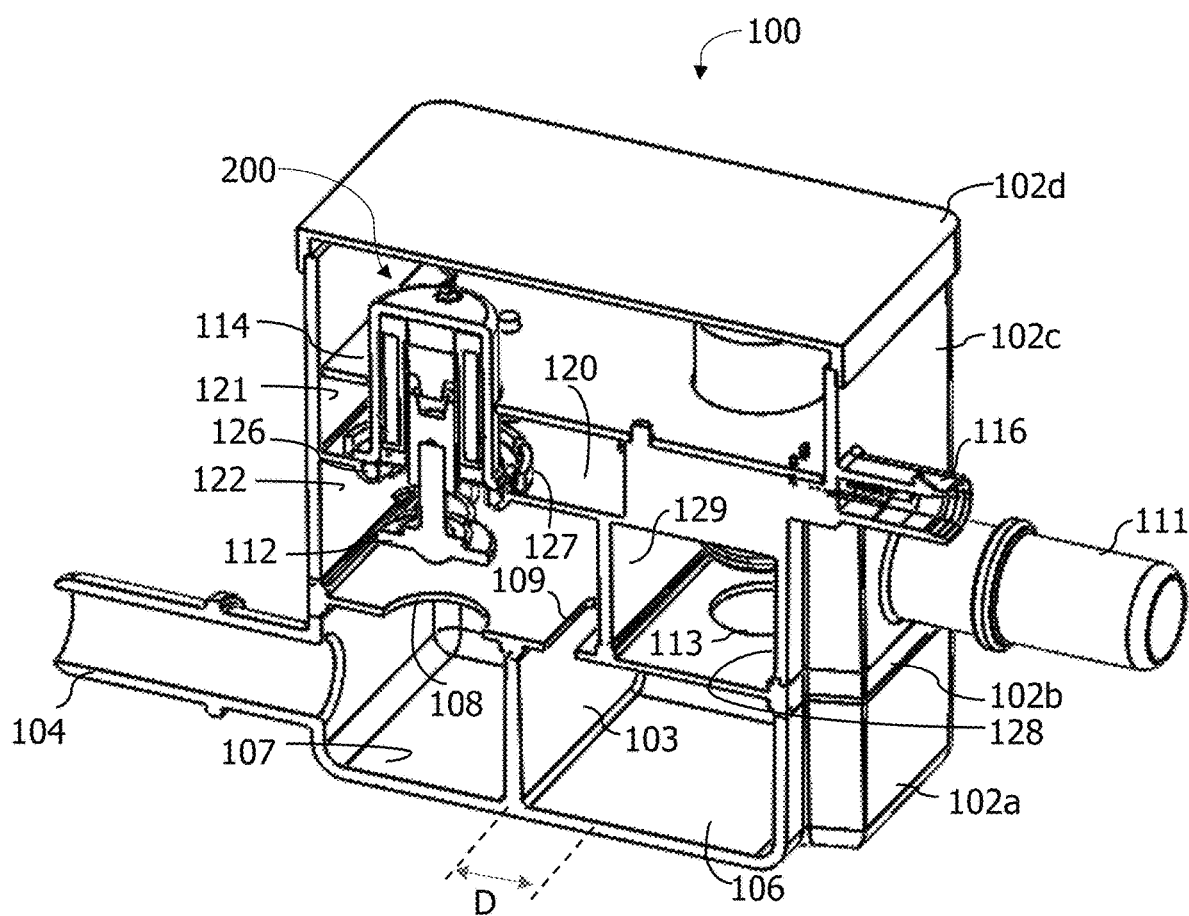
FIG. 4 is a longitudinal cross-section of the three-port latching valve of FIG. 1.

As best seen in FIG. 4, the main body 102c is divided by a plate 120 into an upper section 121 and a lower section 122. Three openings 124 pass through the plate 120. Each opening 124 has a groove 125 to receive a sealing member 126, such as an O-ring, for a fluid tight seal to the stationary portion 214 of the magnetically latching valve 200. Each opening 124 is bounded by a flange 127 extending into the upper section 121 to hold the stationary portion 214 in place. The lower section 122 of the main body 102c has an internal second divider wall 129 extending parallel to the first divider wall 103 in the base 102a. As such, the housing 102 has dual chambers in dual levels, i.e., first and second chambers 106, 107 in the base 102a and third and fourth chambers in the lower section 122 of the main body 102c, which are separated from one another by the first cover 102b (a generally plate-shaped cover). The first divider wall 103 is offset from the second divider wall 129 by a lineal distance D. The first cover 102b has an unobstructed through hole 109 positioned within the offset, within this lineal distance D, between the first divider wall 103 and the second divider wall 129. The unobstructed through hole 109 has an area equal to or larger than the area of each of the first, second, and third valve seat openings 108, 113, 115 individually. The divider walls are oriented perpendicular to the flow direction through the ports 104, 110, 111.

Figure 2:
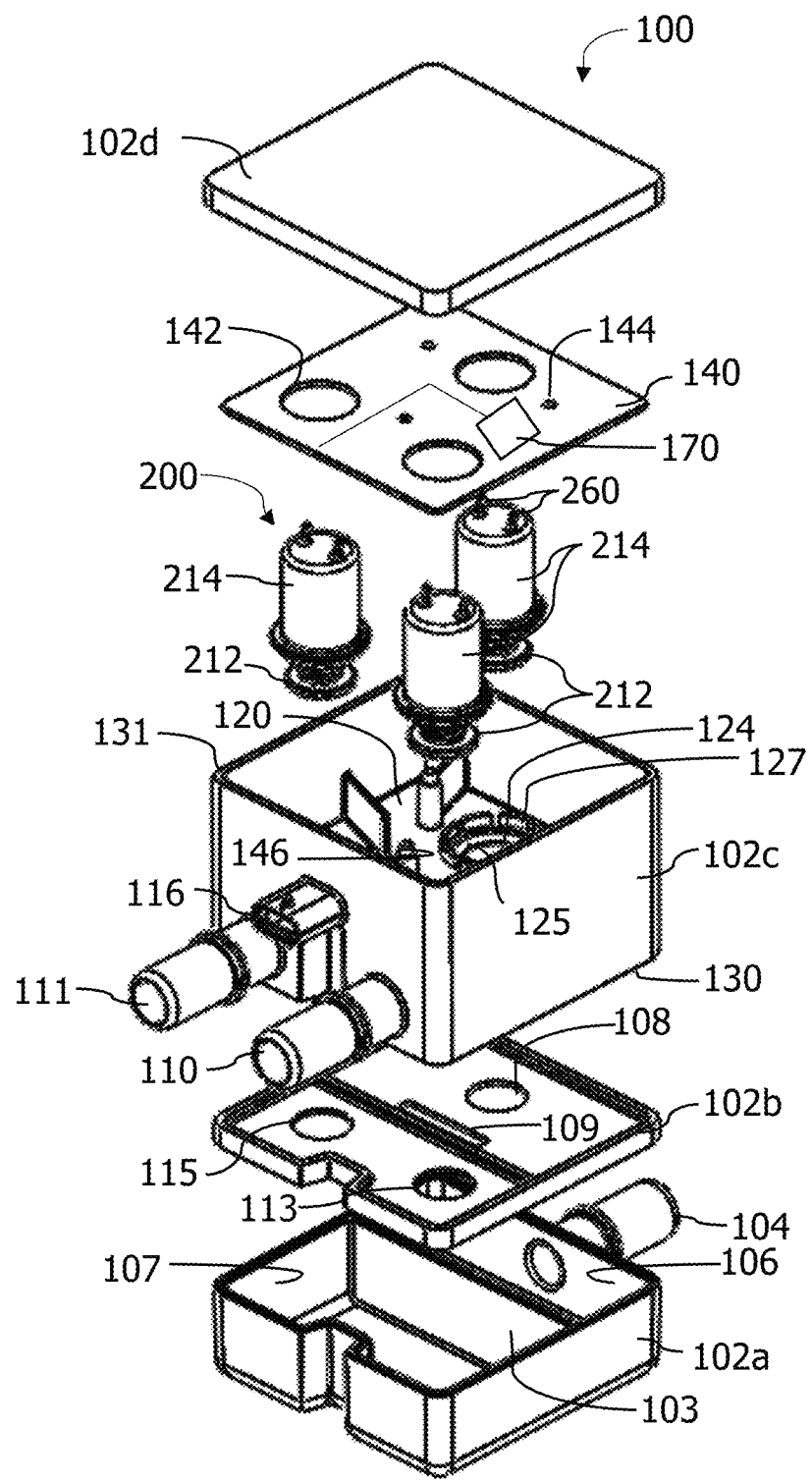
FIG. 2 is an exploded view of the three-port latching valve of FIG. 1.

Referring now to FIGS. 2 and 4, a stabilizing plate 140 seatable over the three magnetically latching valve 200 may be seated in the main body 102c to add further stabilization to the stationary portion 214 of each valve. The stabilizing plate 140 includes three through holes 142 that each receive therein one of the solenoid housings 250. The plate may also include smaller registration holes or pins 144 mateable to mating pins or mating holes 146 in the plate 120.

Figure 3:
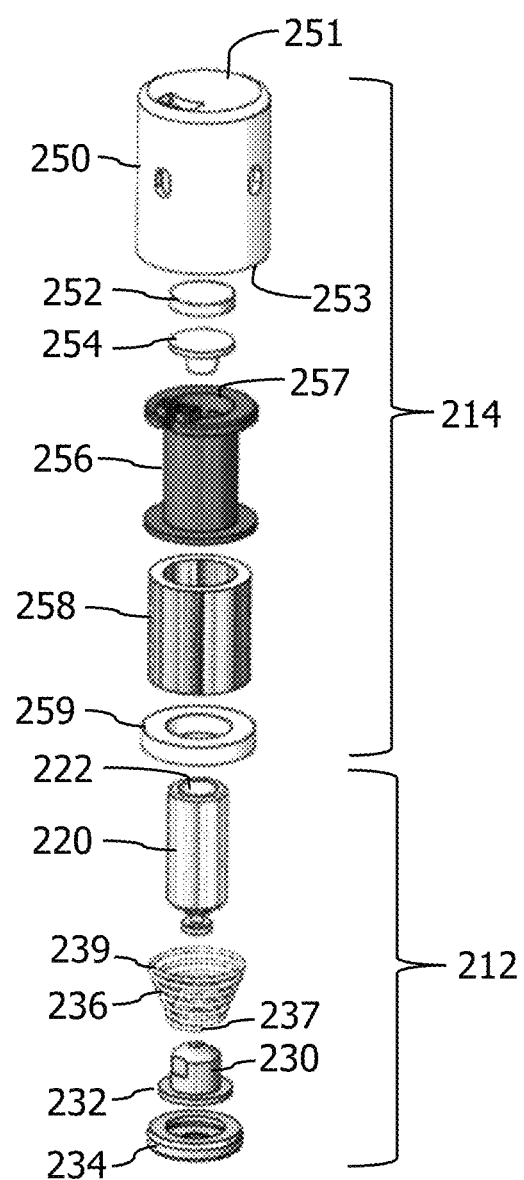
FIG. 3 is an exploded view of the stationary and moving components of one of the three magnetically latching valves housed within the three-port latching valve.

Referring to FIGS. 2-4, the first valve seat opening 108 is openable and closable by the poppet valve 230 of the first magnetically latching valve 200, the second valve seat opening 113 is openable and closable by the poppet valve 230 of the second magnetically latching valve 200, and a third valve seat opening 115 is openable and closable by the poppet valve 230 of the third magnetically latching valve 200. Each poppet valve 230 makes a fluid tight seal with its respective valve opening when the magnetic latching valve 100 is in a closed position. The main body 102c includes an electrical plug or plug receptacle 116 that is in electrical communication with each solenoid 258. The electrical plug or plug receptacle 116 is connectable to a mating electrical connector (not shown) in electrical communication with a controller 380 (FIG. 5) of the fuel vapor management system or an internal combustion engine. Each of the exterior surfaces of the ports 104, 110, 111 may include connecting features, such as flanges, ribs, grooves, barbs, or the like to attach a hose thereto or a duct of a device within the engine system.

The first port 104, the second port 110, and the third port 111 are in controlled fluid communication with one another by the three magnetically latching valves 200 enclosed within the housing 102. Referring now to FIG. 3, each magnetically latching valve 200 can be characterized as having moving components 212 and stationary components 214. The moving components 212 includes the armature 220, the poppet valve 230, an annual seal ring 234 seated over a radially protruding flange 232 of the poppet valve 230, and a spring 236 biasing the poppet valve toward the valve opening 108. The stationary components 114 include a solenoid housing 250, having a closed end 251 and an open end 253, in which is seated, in order, a permanent magnet 252, a stop 254 that receives a first end 222 of the armature 220, a bobbin 256 having a solenoid 258 seated thereon, and a cover 259 fixedly connected to the open end of the housing.

Still referring to FIG. 3, each solenoid housing 250 encloses a linearly translatable armature 220 seated within the solenoid 258, more specifically within the hollow core 257 of the bobbin 256, and it can move between an open position and a closed position, respectively, after a pulse of voltage is supplied to the solenoid 258. The armature 220 is connected to a poppet valve 230, which moves linearly with the armature 220 when the armature moves. The permanent magnet 252 is fixedly seated within the housing 102, and respectively the solenoid housing 250, at a position for magnetically latching the armature 220 in the open position after one pulse of voltage to the solenoid 258 moves the armature 220 to the open position. The spring 236 is seated around the connection of the armature 220 to the poppet valve 230 and has a first end 237 against the poppet valve 230 and a second end 239 against either plate 120 of the main body 102c or against the solenoid housing 250. The spring 236 biases the poppet valve 230 closed against its respective valve opening 108, 113, or 115 when the armature is in the closed position and each spring has a pre-selected spring rate that mechanically relieves pressure if the spring rate is exceeded while the armature 220 is in the closed position.

As seen in FIG. 3, the solenoid housing 250 can include a plurality of boreholes radially through the side thereof for registration with the stabilizing plate 140, if present. The solenoid housing 250 includes an opening 255 in the closed end 251 thereof for electrical wiring or fitting 260, shown in FIG. 2, to connect each solenoid to the electrical plug or plug receptacle 116. In one embodiment, as shown in FIG. 2, a microprocessor 170 (an on-board controller) for electronic control of the three magnetically latching valves 200 can be enclosed within the housing, here shown on the stabilizing plate 140, and is in electrical communication with the electrical connector. In other embodiments, see FIG. 5, a controller 380 that is part of the engine system includes a microprocessor that is in electrical communication with the solenoids and controls the opening and closing of the three magnetically latching valves 200. Either the on-board or the engine controller can operate the three magnetically latching valves with an H-Bridge control system that reverses polarity to allow the armature to move between the two positions, i.e., the open position and the closed position.

Referring again to FIGS. 3 and 4, each spring 236 is a coil spring. In one embodiment, the coil spring is conically shaped and has the smaller end seated against the poppet valve 230. In all embodiments, each spring is tuned to have a pre-selected spring rate set to open the poppet valve 230 at a threshold pressure for a preselected engine condition dependent upon what engine component is connected to the port of the three-port latching valve. It is possible that the engine conditions could result in each spring being tuned to have the same spring rate, or each spring rate being different from all other spring rates, or one spring rate being different from the other two springs' spring rate, which are the same.

The annual seal ring 234 of each poppet valve 230 can be overmolded to the flange 232 thereof or elastically stretched to fit thereover. The annular seal ring 234 may be constructed of a fluoroelastomer. Suitable fluoroelastomers include, but are not limited to, polyvinyl fluoride, polyvinylidene fluorides, polytrifluoromonochloroethylene, polytetrafluoroethylene, polyhexafluoropropylene, polydifluoroethylene, polytetrafluoroethylene, fluorosilicone, ethylenetetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, or other commercially available elastomeric material that will provide seal integrity under fuel management system's operating conditions.

In operation, the magnetically latching valves 200 are each normally closed, with each spring 236 biasing each poppet valve 230 into a fluid tight seal against the respective valve opening 108, 113, 115. When any one or more of the three magnetically latching valves 200 are commanded open, a first pulse of voltage is applied to the respective solenoid 258 to linearly translate its armature 220 to the open position. Then, in an unpowered state, the permanent magnet 252 holds the armature by magnetic attraction thereto with the spring 236 in a compressed state. As is understood, the armature 220 is made of a ferromagnetic material in order to be magnetically attracted to the permanent magnet 252. Subsequently, when the valve needs to be closed, a second pulse of voltage is applied to the selected solenoid 258 that reverses the polarity of the solenoid 258, so that its armature 220 is moved away from the permanent magnet 252. In the closed position, the valve is again in an unpowered state with the spring 236 again biasing the poppet valve 230 into a fluid tight seal against its valve opening 108, 113, or 115. As such, each of the three magnetically latching valves 200 require very little power.

Figure 5:
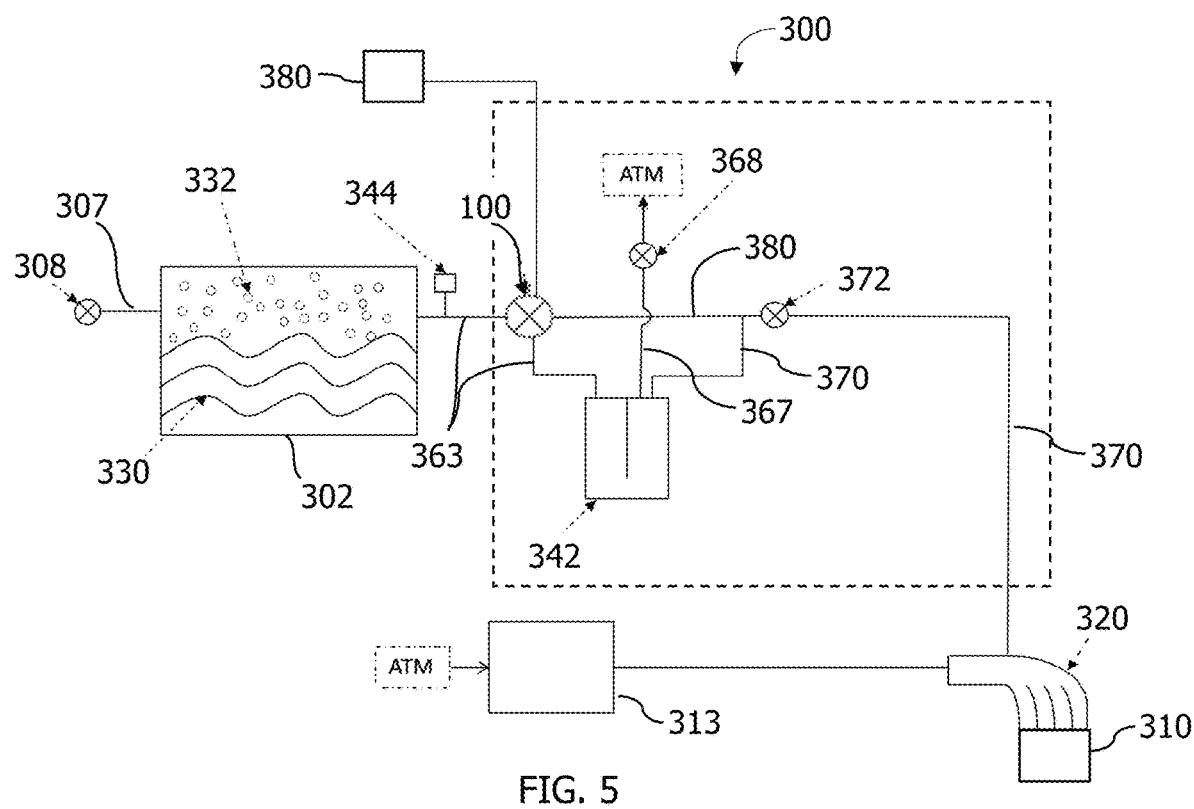
FIG. 5 is a schematic illustration of a fuel vapor management portion of an engine system having a three-port latching valve controlling fluid flow between the fuel tank, a first fuel vapor canister, and an intake manifold of an engine.

Referring now to FIG. 5, an internal combustion engine (ICE) system 300 is shown, which can be a standard ICE or a hybrid engine. The hybrid engine can be a full hybrid electric vehicle or a plug-in hybrid electric vehicle. The ICE can be a turbocharged or supercharged system having a turbocharger, a supercharger or the like, referred to herein collectively as a turbocharger (not shown). The engine system 300 is configured for combusting fuel vapor from a fuel tank 302 which accumulates in at least one component thereof and includes a multi-cylinder internal combustion engine 310 using a non-integrated refueling canister only system (NIRCOS). The engine system 300 receives atmospheric air (ATM) from an air intake, which may include an air filter 313 (also known as an air cleaner). If a turbocharger is present, it has a turbine operating a compressor, which receives air from the air intake air filter 313, compresses the air, and directs a flow of compressed air (or boosted air) downstream through a charge air cooler or intercooler (not shown) to a throttle, and then to the intake manifold 320. The throttle controls fluid communication between the compressor and the intake manifold 320 of the engine 310. The throttle is operable using known techniques to vary an amount of intake air provided to the intake manifold 320 and the cylinders of the engine.

A Venturi device (not shown) having the particulars of any of the devices in any of Applicant's co-pending applications or granted patents, e.g., U.S. Pat. Nos. 9,827,963 and 9,534,704, may be present in the engine system 300 to create vacuum for any component in need thereof.

Still referring to FIG. 5, the fuel tank 302 is a reservoir for holding fuel 330 and fuel vapors 332 to be supplied to the internal combustion engine 310 via a fuel deliver system such as a fuel pump (not shown) and includes a filler neck 307 and a filler valve 308 that receives a refill nozzle. A pressure sensor 344 may be present between the fuel tank 302 and the three-port latching valve 100 to detect high pressure of the fuel tank vapors 332. The fuel tank 302 is operatively connected to a fuel vapor canister 342 for fluid communication of fuel vapors 332 therewith through a first conduit 363. Fuel vapor canister 342 contains carbon and is well known. The first conduit 363 includes the three-port latching valve 100 described above. The fuel vapor canister 342 has a second conduit 367 in fluid communication with the atmosphere. A canister vent valve or an evaporative leak check monitor 368 is present in the second conduit 367 and controls the fluid communication between the fuel vapor canister 342 and atmosphere (ATM). A canister purge valve 372 is present in the conduit 370 between the fuel vapor canister 342 and the intake manifold 220 to control fluid communication therebetween.

The three-port latching valve 100 has a first port 104 in fluid communication with the fuel tank 302, a second port 110 in fluid communication with the fuel vapor canister 342, both of which control fluid flow in the first conduit 363, and a third port in fluid communication with the intake manifold 320 of the engine 310 through a bypass conduit 380 that bypasses the fuel vapor canister 342 and is in direct fluid communication with the canister purge valve 372. The three-port latching valve 100 controls fluid communication between the fuel tank's fuel vapors 332 and the fuel vapor canister 342 and the intake manifold 320 with five possible flow states: (i) no flow through the three-port magnetically latching valve, (ii) flow from the first port to the second port, i.e., flow of fuel vapors to the fuel vapor canister, (iii) flow from the first port to the third port, i.e., flow directly of fuel vapors to the intake manifold, (iv) flow from the second port to the third port, i.e., flow out of the inlet of the fuel vapor canister into the second conduit, and (iv) flow with all the ports open, i.e., flow of fuel vapors into the fuel vapor canister and directly to the intake manifold.

The controller 380 can regulate the operation of the engine 310 and its fuel delivery as well as other vehicle systems. The controller 380 is electrically connected to the three-port latching valve 100 via the electrical plug or electrical receptacle 116 of the valve 100 to control the opening and closing of the three magnetically latching valves 200 housed therein.

Figure 6:
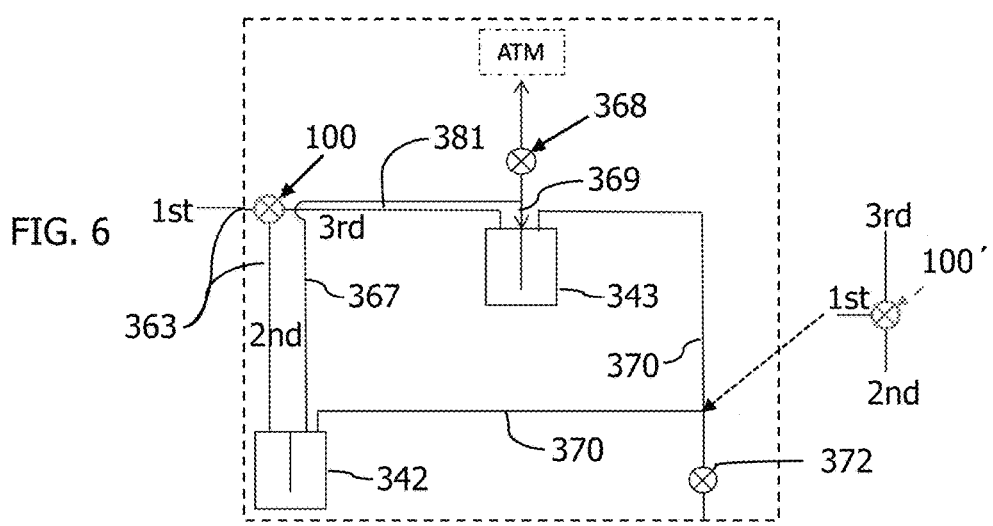
FIG. 6 is a schematic illustration of a fuel vapor management portion of an engine system that has dual fuel vapor canisters and a three-port latching valve between the fuel tank and both canisters, and optionally a secondary three-port latching valve controlling fluid flow between the two canisters and an intake manifold of an engine.

Turning now to FIG. 6, the portion inside the dashed box in FIG. 5 can be replaced with the configuration shown here. This alternate system is a dual fuel vapor canister system. The three-port latching valve 100 is in fluid communication between the fuel tank 302 and a first fuel vapor canister 342 and between the fuel tank 302 and a second fuel vapor canister 343. The fuel vapor canisters 342, 343 contains carbon and are well known. The first fuel vapor canister 342 can be a primary canister and the second fuel vapor canister 343 can be the auxiliary canister, where the primary canister has a high restriction compared to the auxiliary canister, which has a low restriction, i.e., a restriction that is less than that of the primary canister. Also, typically, the primary canister has a larger volume than the secondary canister, but that is not required. The first conduit 363 includes the three-port latching valve 100 described above. The fuel vapor canister 342 has a second conduit 367 in fluid communication with the atmosphere. A canister vent valve or an evaporative leak check monitor 368 is present in the second conduit 367 and controls the fluid communication between the first fuel vapor canister 342 and atmosphere (ATM). Likewise, the second fuel vapor canister 343 has a third conduit 369 in fluid communication with atmosphere which is controlled by the canister vent valve or an evaporative leak check monitor 368. A canister purge valve 372 is present in the fourth conduit 370 between the first fuel vapor canister 342 and the intake manifold 320 and between the second fuel vapor canister 343 and the intake manifold 320 to control fluid communication therebetween.

The three-port latching valve 100 has a first port 104 in fluid communication with the fuel tank 302, a second port 110 in fluid communication with the first fuel vapor canister 342, both of which control fluid flow in the first conduit 363, and a third port in fluid communication with the a second fuel vapor canister 343. The first and second fuel vapor canisters 342, 343 are both in fluid communication with the intake manifold 320 of the engine 310, which is controlled by the canister purge valve 372. The three-port latching valve 100 controls fluid communication between the fuel tank's fuel vapors 332 and the fuel vapor canister 342 and the intake manifold 320 with five possible flow states: (i) no flow through the three-port magnetically latching valve, (ii) flow from the first port to the second port, i.e., flow of fuel vapors to the first fuel vapor canister, (iii) flow from the first port to the third port, i.e., flow of fuel vapors to the second fuel vapor canister, (iv) flow from the second port to the third port, i.e., flow between the first and second fuel vapor canisters, and (iv) flow with all the ports open, i.e., flow of fuel vapors into both fuel vapor canisters simultaneously. This configuration enables the system to load fuel vapors into either one of the fuel vapor canisters 342, 343 individually and sequentially or to load them simultaneously based on the needs of the engine and the fuel vapor management system.

Here, the three-port latching valve 100 can be controlled by the controller 380 to load first fuel vapor canister (primary canister) to a preselected amount that is less than its total volume and then switch to loading the second fuel vapor canister (i.e., the auxiliary canister) because the second fuel vapor canister can be purged quicker since it has a lower restriction. The controller can calculate approximately how much fuel vapor is in the first fuel vapor canister while purging the first fuel vapor canister, and when nearly empty, can start loading the second fuel vapor canister. Furthermore, when the second fuel vapor canister is purged, the controller can load both fuel vapor canisters simultaneously by opening all three of the latching of the magnetically latching valves.

Then, while refueling, the second fuel vapor canister could be loaded first since it can be purged more quickly. The controller can determine based on the amount of fuel added to the fuel tank during refueling at what point the second fuel vapor canister is loaded, its volume is filled, and will open and close the necessary magnetically latching valves to close flow to the second fuel vapor canister and open flow to the first fuel vapor canister for loading therein. This will provide better emission performance during refueling, purging and loading while driving or even when the vehicle is "soaking." Soaking means the evaporative hydrocarbon emissions which escape from a vehicle during the first hour after the engine is stopped.

Still referring to FIG. 6, optionally, a second three-port latching valve 100' can be added to the system at a junction of the fourth conduit 370 between the first and second fuel vapor canisters 342, 343 upstream of the canister purge valve 372. This second three-port latching valve 100' also provides five possible flow states and enables purging of fuel vapors from either of the fuel vapor canisters individually, sequentially, or simultaneously based on the needs of the engine and fuel vapor management system. The second three-port latching valve's five flow states are: (i) no flow through the three-port magnetically latching valve, (ii) flow from the first port to the second port, i.e., flow from the first fuel vapor canister to the intake manifold, (iii) flow from the first port to the third port, i.e., flow between the dual fuel vapor canisters, (iv) flow from the third port to the second port, i.e., flow from the second fuel vapor canister to the intake manifold, and (iv) flow with all the ports open, i.e., simultaneous flow of fuel vapors from both fuel vapor canisters simultaneously to the intake manifold.

Further, this optional configuration of FIG. 6 enables the controller to choose which one of the two fuel vapor canisters 342, 343 is loaded (or both) and which one of the two fuel vapor canisters 342, 343 is purged (or both) at any preselected time based on engine conditions. Expressed differently, the first three-port latching valve 100 isolates the fuel tank 302 from the first and second fuel vapor canisters 342, 343 and the second three-port latching valve 100' isolates the first and second fuel vapor canisters 342, 343 from the intake manifold 320 and the canister purge valve 372. This configuration enables selective control of which canister is loaded at a given moment in time or which canister is purged at the same or a different moment in time. This system can isolate the fuel tank from the dual fuel vapor canisters in compliance with a NIRCOS evaporative emissions system.

Figure 7:
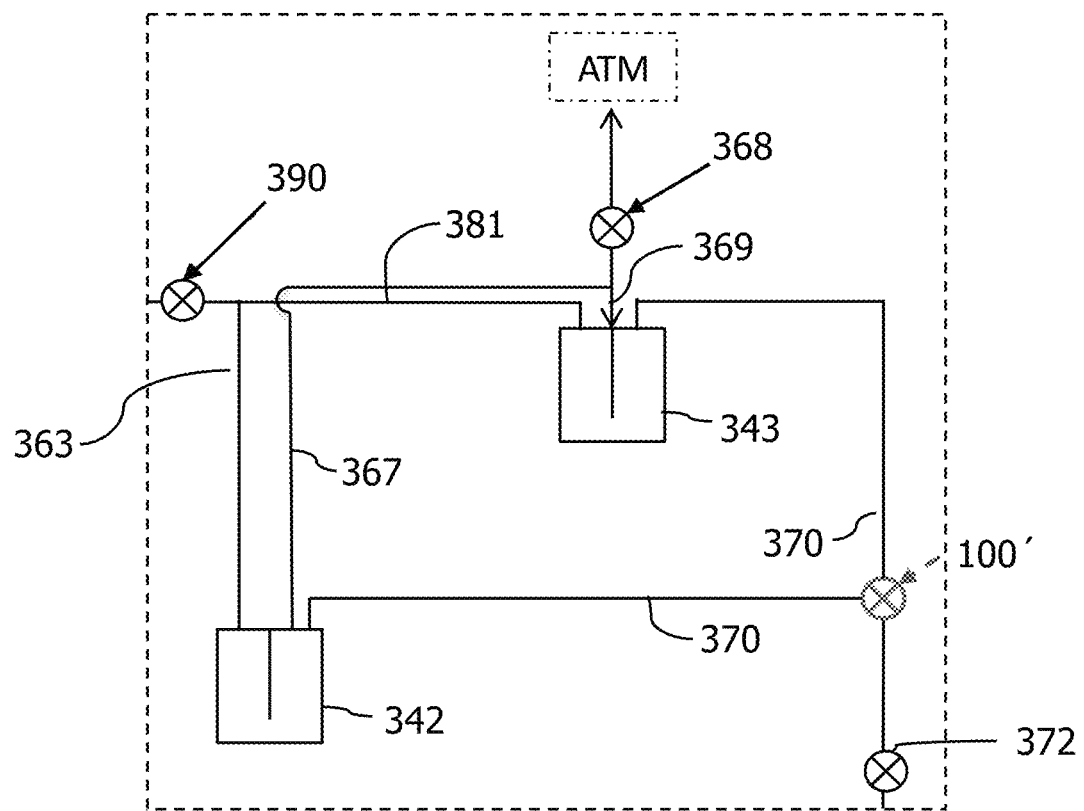
FIG. 7 is a schematic illustration of a fuel vapor management portion of an engine system that has dual fuel vapor canisters and a three-port latching valve controlling fluid flow from the dual fuel vapor canisters to an intake manifold of an engine.

Turning now to FIG. 7, the portion inside the dashed box in FIG. 5 can be replaced with the configuration shown here. This alternate system is a dual fuel vapor canister system having a single three-port latching valve 100' downstream of the dual fuel vapor canisters 342, 343, but upstream of the canister purge valve 372. Rather than having the first three-port latching valve 100, a vapor blocking valve 390 is positioned between the fuel tank 302 and the conduits 363 and 381 leading to the first and second fuel vapor canisters 342, 343. The fuel vapor canisters 342, 343 contain carbon and are well known. The fuel vapor canister 342 has a second conduit 367 in fluid communication with the atmosphere. A canister vent valve or an evaporative leak check monitor 368 is present in the second conduit 367 and controls the fluid communication between the first fuel vapor canister 342 and atmosphere (ATM). Likewise, the second fuel vapor canister 343 has a third conduit 369 in fluid communication with atmosphere which is controlled by the canister vent valve or an evaporative leak check monitor 368. A canister purge valve 372 is present in the fourth conduit 370 between the single three-port latching valve 100' and the intake manifold 320. Here, purging of the dual fuel vapor canisters is controllable to be individually, sequentially, or simultaneously as needed under preselected engine conditions, which is controlled by the controller based on engine operating conditions.

Furthermore, the controller not only selects which fuel vapor canister to purge, but can control the single three-port latching valve 100' such that the purge can be stopped at a desired level, rather than emptying the canister, and when to switch to the other canister. If both fuel vapor canisters are fully loaded, the controller may purge the second fuel vapor canister (the auxiliary canister) first because it is able to remove the hydrocarbons quicker and more efficiently than the first canister because of the higher restriction in the primary canister as compared the auxiliary canister.

One advantage of the magnetic latching valve 100 is that valve is very compact and light weight and each solenoid only requires a 3 mm armature stroke, in contrast to commercially available mechanical latching valves which require a larger amount of power to overcome a 7 mm armature stroke. Secondly, each valve will hold itself, unpowered, in both the open position and the closed position after a single pulse of voltage to the solenoid. The permanent magnet holds the armature and poppet in the open position. The spring biases the poppet, and hence the armature, in the closed position. Another advantage is the ability to tune each springs spring rate for the three magnetically latching valves 100 to open at preselected threshold temperatures coinciding with engine operating conditions.

In comparison to mechanical latching (indexing) valves, the valve 100 has fewer moving parts and is considerably lower which respect to noise, vibration, and harshness (NVH) due to removing the mechanical latching indexing components. Also, there are less potential failure modes because of the reduction in the number of moving components and total components.

With respect to the engine systems, the engine system of FIG. 5 has the advantage of lower emissions during cold starts, especially when fuel vapor can be drawn directly from the fuel tank into the intake manifold to be burned as a fuel source instead of using liquid fuel that does not burn until the catalyst reaches operating temperature. The dual canister system of FIG. 6 having the three-port, five-way magnetic latching valve has the advantage of isolating each canister for individual selection for loading at pre-selected times. Also, the magnetic latching valve reduces the number of valves needed in the system. With the inclusion of the optional second three-port, five-way magnetic latching valve, the system of FIG. 6 also has the advantage of providing strategic purging of the canisters under pre-selected operating conditions, which is controllable by a powertrain control module (PCM). FIG. 7 only has the three-port, five-way magnetic latching valve in a position downstream of the canisters, which provides the advantage of strategic purging of the dual canisters (individually or collectively) under pre-selected operating conditions, which is controllable by the PCM.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A three-port latching valve for an engine system comprising:
    a housing having a first port, a second port, and a third port in controlled fluid communication with one another by three magnetically latching valves enclosed within the housing; wherein each magnetically latching valve comprises:
        a solenoid housing enclosing a linearly translatable armature seated within a solenoid and connected to a poppet valve; wherein the armature is movable between an open position and a closed position, respectively, after a pulse of voltage to the solenoid;
        a permanent magnet fixedly seated within the solenoid housing at a position for magnetically latching the armature in the open position after one pulse of voltage to the solenoid moves the armature to the open position; and
        a spring seated around the connection of the armature to the poppet valve with a first end against the poppet valve and a second end against the housing or solenoid housing; wherein the spring biases the poppet valve closed when the armature is in the closed position and has a pre-selected spring rate that mechanically relieves pressure if the spring rate is exceeded;
        wherein the armature is in an unpowered state after translation to either of the open position or the closed position;
    wherein the three magnetically latching valves are each individually electrically controllable and collectively provide for a no flow position, flow between the first port and the second port, flow between the first port and the third port, flow between the second port and the third port, and flow between the first port, the second port, and the third port.

2. The latching valve of claim 1, wherein the housing of the three-port latching valve defines dual chambers in dual levels, wherein the dual levels are separated by a plate and the dual chambers are separated by a first divider wall in a first of the dual levels and a second divider wall in a second of the dual levels, wherein the first divider wall is offset from the second divider wall by a lineal distance (D).

3. The latching valve of claim 2, wherein the plate has an unobstructed through hole positioned in the lineal distance (D) between the first divider wall and the second divider wall.

4. The latching valve of claim 3, wherein the plate has a first valve seat opening therethrough that is openable and closable by the poppet valve of the first magnetically latching valve, a second valve seat opening therethrough that is openable and closable by the poppet valve of the second magnetically latching valve, and a third valve seat opening therethrough that is openable and closable by the poppet valve of the third magnetically latching valve.

5. The latching valve of claim 4, wherein the unobstructed through hole has an area equal to or larger than the area of each of the first, second, and third valve seat openings individually.

6. The latching valve of claim 1, wherein the spring is a coil spring.

7. The latching valve of claim 6, wherein the spring is a conically shaped coil spring.

8. The latching valve of claim 1, wherein the housing of the three-port latching valve has an electrical connector in electrical communication with the solenoid of each of the three magnetically latching valves.

9. The latching valve of claim 8, wherein a microprocessor for electronic control of the three magnetically latching valves is enclosed within the housing of the three-port latching valve and is in electrical communication with the electrical connector.

10. A fuel vapor management system for an engine, the system comprising:
    a fuel tank in fluid communication with a filling tube and in fluid communication an intake manifold of an internal combustion engine;
    a first fuel canister in fluid communication between the fuel tank and the intake manifold;
    a three-port latching valve according to claim 1 controlling fluid communication between vapors in the fuel tank, the first fuel vapor canister, and the intake manifold, wherein the fluid communication with the intake manifold is direct or indirect, wherein indirect fluid communication is through a second fuel vapor canister; and
    wherein each of the three magnetically latching valves within the three-port latching valve is in electrical communication with a controller;
    wherein the controller controls the opening and closing of each of the three magnetically latching valves individually, and the pre-selected spring rate of each of the three magnetically latching valves is selected to mechanically relieves pressure if the spring rate is exceeded while the armature is in the closed position.

11. The system of claim 10, wherein the housing of the three-port latching valve has an electrical connector in electrical communication with the solenoid of each of the three magnetically latching valves, and the electrical connector is connected to a mating electrical connector in electrical communication with the controller.

12. The system of claim 10, wherein the controller includes an H-bridge control system that reverse the polarity of the solenoid to move the armature between the open position and the closed position.

13. The system of claim 10, wherein the engine is a hybrid internal combustion engine.

14. The system of claim 13, comprising a canister purge valve controlling fluid communication between the fuel vapor canister and the intake manifold.

15. The system of claim 14, comprising a secondary three-port latching valve according to claim 1 positioned upstream of the canister purge valve, wherein the three-port latching valve is in fluid communication with an outlet of the first fuel vapor canister, an outlet of the second fuel vapor canister, and the intake manifold through the canister purge valve.

16. The system of claim 10, wherein the pre-selected spring rates of the three magnetically latching valves are the same, one is different from the others, or each is different from one another.

17. A fuel vapor management system for an engine, the system comprising:
   a fuel tank in fluid communication with a filling tube and in fluid communication with a first fuel vapor canister and a second fuel vapor canister which are both in fluid communication with an intake manifold of an internal combustion engine;
   a vapor blocking valve controlling fluid communication between the vapor dome of the fuel tank and the first and second fuel vapor canisters; and
   a three-port latching valve according to claim 1 positioned upstream of a canister purge valve, wherein the three-port latching valve controls fluid communication with an outlet of the first fuel vapor canister, an outlet of the second fuel vapor canister, and the intake manifold through the canister purge valve;
   wherein each of the three magnetically latching valves within the three-port latching valve is in electrical communication with a controller;
   wherein the controller controls the opening and closing of each of the three magnetically latching valves individually, and the pre-selected spring rate of each of the three magnetically latching valves is selected to mechanically relieves pressure if the spring rate is exceeded while the armature is in the closed position.

18. The system of claim 17, wherein the housing of the three-port latching valve has an electrical connector in electrical communication with the solenoid of each of the three magnetically latching valves, and the electrical connector is connected to a mating electrical connector in electrical communication with the controller.

19. The system of claim 17, wherein the engine is a hybrid internal combustion engine.

20. The system of claim 17, wherein the pre-selected spring rates of the three magnetically latching valves are the same, one is different from the others, or each is different from one another.

* * * * *